United States Patent Office 3,271,372
Patented Sept. 6, 1966

3,271,372
METHOD OF REMOVING COORDINATION CATA-
LYST RESIDUES FROM HYDROCARBON POLY-
MER SLURRIES WITH ALCOHOL
Stanley W. Caywood, Jr., Swarthmore, Pa., assignor to
E. I. du Pont de Nemours and Company, Wilmington,
Del., a corporation of Delaware
No Drawing. Filed Feb. 28, 1962, Ser. No. 176,441
9 Claims. (Cl. 260—80.5)

This invention relates to a process for the purification of hydrocarbon copolymers. More particularly, it concerns a novel process for the removal of vanadium catalyst residues from ethylene hydrocarbon copolymers when these copolymers are in slurry form in methylene chloride.

Hydrocarbon copolymers of ethylene are of increasing commercial importance today, especially for use as elastomers. A valuable process for making these elastomers in slurry form involves the use of vanadium coordination catalysts. For many purposes it is desirable that these ethylene copolymers have a very low vanadium content. It is difficult to remove the vanadium in a convenient manner. Repeated alcohol washings of the filter cake, composed of copolymer and methylene chloride, remove the vanadium residue satisfactorily if extremely efficient agitation is provided. Means for effecting such agitation are only convenient on a laboratory scale. Washing with methylene chloride alone results in poor catalyst removal and, furthermore, tends to dissolve low molecular weight copolymer fractions thereby harming the copolymer product and complicating the recycle of the polymerization medium.

It is, therefore, an object of the present invention to provide a novel method for purifying hydrocarbon copolymers. Another object is to provide a novel method for the removal of vanadium catalyst from hydrocarbon copolymers. A further object is to provide a process for vanadium catalyst removal from methylene chloride slurries of ethylene hydrocarbon copolymers. Still another object is to provide a process for vanadium catalyst removal from ethylene hydrocarbon copolymer slurry filter cakes, which process satisfactorily removes the vanadium catalyst and leaves a filter cake in a form convenient to handle. Other objects will appear hereinafter.

These and other objects are accomplished by the novel process described below for the removal of vanadium catalyst residues from a normally solid hydrocarbon copolymer. The hydrocarbon copolymer is prepared by copolymerizing ethylene and at least one other copolymerizable monomer in the presence of a catalyst formed by mixing a vanadium salt with either an aluminum trialkyl, an alkyl aluminum halide, or the reaction product of a molar proportion of an aluminum trialkyl and 0.5–2 molar proportions of an aluminum halide. The vanadium catalyst residue is removed by (A) forming a granular slurry of the copolymer with a mixture consisting of 90–65 percent by volume of methylene chloride and 10–35 percent by volume of either an alcohol having up to 4 carbon atoms or a mixture of at least two of such alcohols thereby washing said copolymer and (B) separating the copolymer from the slurry.

The substance of the present invention lies in the manner in which the copolymer is washed. This is done by forming a slurry of the copolymer in a liquid mixture containing methylene chloride and at least one alcohol in critical proportions. The slurry exists in a granular form. In representative slurries the major portion of the particles of swollen copolymers (containing methylene chloride and alcohol) ranges in size from about $\frac{1}{32}$ to $\frac{1}{4}$ inch in diameter, although it is to be understood that larger and smaller particles can be present. The vanadium catalyst passes from the swollen copolymer particles and is taken up by the surrounding liquid phase. Subsequent mechanical separation of the swollen copolymer from the liquid phase by conventional mechanical means, such as filtration, decantation, or centrifugation, completes the purification process. The swollen copolymer is freed from alcohol and methylene chloride by conventional means thereafter, if desired.

The copolymers which may be prepared according to the improved process of the present invention are the normally solid copolymers of ethylene and at least one other copolymerizable compound. In order to get a copolymer with desirable elastomeric properties it should contain between about 20 to 75 percent by weight of ethylene units. Representative copolymers are those obtained by copolymerizing ethylene with an alpha monoolefin having the structure R—CH=CH$_2$ wherein R is an alkyl radical of not more than eight carbon atoms or by copolymerizing ethylene, an alpha monoolefin as defined above and a non-conjugated hydrocarbon diene. Representative dienes include dicyclopentadiene; an aliphatic diene having the structure

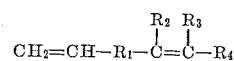

wherein $R_1$ is an alkylene radical, $R_2$ and $R_3$ are independently selected from the group consisting of hydrogen and alkyl radicals and $R_4$ is an alkyl radical and wherein $R_1$ to $R_4$ are so selected that the diene has from about 6 to 22 carbon atoms; a 5-alkenyl-substituted-2-norbornene; 5-methylene-2-norbornene; and 2-alkyl-2,5-norbornadienes.

Representative examples of copolymers of ethylene and at least one alpha monoolefin as defined above are ethylene/propylene, which is preferred; ethylene/1-butene; ethylene/1-heptene; ethylene/1-decene; ethylene/propylene/1-butene; ethylene/1-pentene/1-octene; ethylene/5-methyl-1-hexene; ethylene/4-methyl-1-pentene/5,6,6-trimethyl-1-heptene; and ethylene/1-butene/1-pentene/1-nonene.

Representative examples of aliphatic dienes, having the structure

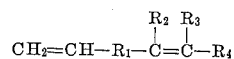

wherein the R's are as defined above, include 1,4-hexadiene, which is preferred; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Dienes such as 11-ethyl-1,11-tridecadiene are made by reacting an alkyl Grignard reagent with the alkyl ester of an ω-unsaturated carboxylic acid and dehydrating the tertiary alcohol thereby produced.

Examples of copolymers of ethylene, an alpha monoolefin and at least one of these aliphatic dienes include ethylene/propylene/1,4-hexadiene, which is preferred; ethylene/1-butene/1,4-hexadiene/11-ethyl-1,11-tridecadiene; ethylene/1-butene/1-octene/6-methyl-1,5-heptadiene; and ethylene/1-pentene/1,4-hexadiene/1,9-octadecadiene.

These copolymers have intrinsic viscosities in tetrachloroethylene at 30° C. of 1.0 to 10 (corresponding to viscosity-average molecular weights of about 30,000 and 700,000 respectively) and contain about 0.1 to 2.5 gram-moles, preferably 0.1 to 1.0 gram-mole, of diene units per kilogram.

Another group of copolymers which may be prepared according to the present invention are those copolymers of ethylene, at least one alpha monoolefin as defined above and dicyclopentadiene. Representative examples include ethylene/propylene/dicyclopentadiene, which is preferred; ethylene/1 - butene/dicyclopentadiene; ethylene/propylene/1 - butene/dicyclopentadiene; ethylene/1-octene/dicyclopentadiene; ethylene/propylene/1 - hexene/dicyclopentadiene; ethylene/1 - heptene/1-decene/dicyclopentadiene; and ethylene/5 - methyl-1-heptene/dicyclopentadiene. In order that these copolymers be elastomeric, they should contain at least about 20 percent ethylene monomer units by weight, at least about 25 percent

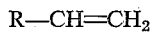

monomer units (as described) by weight, and no more than about 25 percent dicyclopentadiene monomer units by weight. The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher R—CH=CH$_2$ content are known to be leathery and boardy. There are present in the copolymer about 0.1 to 2.5 gram-moles, preferably 0.1 to 1.0 gram-mole, of diene units per kilogram of copolymer.

Still another group of copolymers which may be prepared and isolated are those copolymers of ethylene, at least one alpha monoolefin as defined above and a 5-alkenyl-substituted-2-norbornene or 5-methylene-2-norbornene.

To obtain 5-methylene-2-norbornene, allene having the formula H$_2$C=C=CH$_2$ is heated in the absence of a polymerization initiator with cyclopentadiene. Preferably the reaction is carried out at a temperature of 175–225° C. and still more preferably above 200° C. and in the presence of an addition polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is inert to the reactants and is capable of withstanding the operating pressures. Reaction vessels made of glass, stainless steel and glass-lined steel are quite satisfactory. The reaction time can be varied widely. Times ranging from 2–24 hours or more at 150° C. to 250° C. are operable. Very good results are obtained in reaction periods ranging from 4 to 16 hours. Reactants which are commercially available in the grades used for polymerization are satisfactory for use in making 5-methylene-2-norbornene. However, best results are obtained when the allene is relatively pure.

Representative examples of copolymers of ethylene, at least one alpha monoolefin and 5-methylene-2-norbornene include ethylene/propylene/5-methylene-2-norbornene;
ethylene/1-butene/5-methylene-2-norbornene;
ethylene/1-decene/5-methylene-2-norbornene;
ethylene/5,5 - dimethyl-1-octene/5-methylene-2-norbornene;
ethylene/4-methyl-1-hexene/5-methylene-2-norbornene;
ethylene/4,4 - dimethyl - 1-pentene/5-methylene-2-norbornene;
ethylene/5,6,6 - trimethyl - 1-heptene/5-methylene-2-norbornene.

The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher R—CH=CH$_2$ content are known to be leathery and boardy.

The 5-methylene-2-norbornene diolefin monomer units should be present in sufficient amount to provide for sulfur curability, i.e., at least about 0.0 gram-mole per 100 grams of elastomer, while the maximum amount present by weight should be such as to not interfere seriously with the elastic character of the product, i.e., not over about 20 percent by weight.

As another indication of adequate curability, the iodine number of the copolymer should be at least 5. The iodine number is a measure of the total unsaturation of the polymer and this unsaturation arises from (1) the methylene radical of 5-methylene-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

The 5-alkenyl-2-norbornenes may be described by the following formula

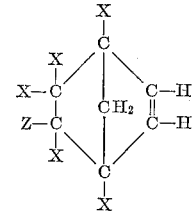

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

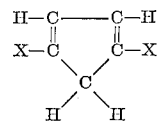

in which X is as heretofore described; the X's can be the same or different. The reaction is carried out at autogenous pressure in a closed inert (e.g. glass and stainless steel) container at temperatures ranging between about 150 to 250° C., preferably 175–225° C., for times ranging between about 2 to 24 hours. It is preferred that an addition polymerization inhibitor (e.g. hydroquinone) be present. Representative syntheses of this type are: the formation of 5-(2'-butenyl)-2-norbornene from cyclopentadiene and 1,4-hexadiene; the preparation of 5-(1'-propenyl)-2norbornene from cyclopentadiene and 1,3-pentadiene (often called piperylene).

The reaction of cyclopentadiene with conjugated dienes having the structure X'—CH=CH—CH=CH—X", where X' and X" are alkyl radicals, can be used to prepare 6-alkyl-5-alkenyl-2-norbornenes having the structures

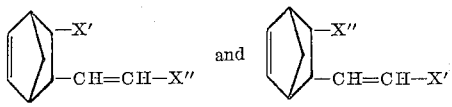

The reaction of cyclopentadiene with unsymmetrical non-conjugated dienes of the structure

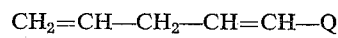

where Q is an alkyl radical will lead to 5-(2-alkenyl)-2-norbornenes

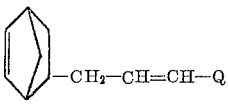

The reaction of cyclopentadiene with conjugated dienes of the formula CH$_2$=CH—CH=CH—Q', where Q' is an alkyl radical, will produce

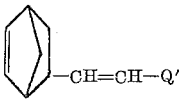

The 2-norbornenes having the structures

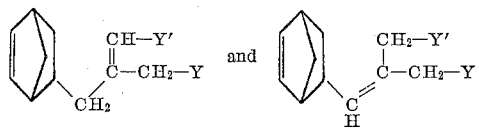

where Y is H or alkyl and Y' is alkyl, are made by reacting the Grignard reagent of 5 - bromomethyl-2-norbornene in ether with ketones having the structure

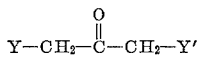

and dehydrating the resulting tertiary carbinol in refluxing toluene in the presence of anhydrous copper sulfate. The preparation of 5-(2'-ethyl-2'-butenyl)-2-norbornene from diethyl ketone is typical.

Representative examples of the heretofore described 2-norbornenes include:

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5-(2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene; and
5-(2'-ethyl-1'-octenyl)-2-norbornene.

Representative examples of copolymers of ethylene, at least one alpha monoolefin and a 5-alkenyl-2-norbornene include
ethylene/propylene/5-(2'-butenyl)-2-norbornene;
ethylene/propylene/5-(2'-ethyl-2'-butenyl) - 2 - norbornene;
ethylene/propylene/5 - (2'-ethyl - 1'-butenyl) - 2 - norbornene;
ethylene/propylene/5 - (1' - propenyl) - 2 - norbornene;
ethylene/1 - butene/5 - (2'-heptyl - 1' - undecenyl)-2-norbornene;
ethylene/1-butene/5-(2'-butenyl)-2-norbornene;
ethylene/1 - butene/5-(2'-ethyl-2'-butenyl)-2-norbornene;
ethylene/4,4 - dimethyl - 1 - hexene/5-(2'-propyl-2'-pentenyl)-2-norbornene;
ethylene/5,5 - dimethyl - 1 - octene/5-(2'-nonyl-2'-heptenyl)-2-norbornene;
ethylene/6 - methyl - 1 - heptene/5-(2'-methyl-2'-decenyl)-2-norbornene;
ethylene/1 - decene/5-(2'-hexyl-2'-butenyl)-2-norbornene; and
ethylene/5,6,6 - trimethyl-1-heptene/5-(2'-octyl-2'-butenyl)-2-norbornene.

The ethylene monomer unit concentration ranges in general from about 20 percent to about 72.5 percent by weight. Copolymers having more ethylene monomer units tend to be stiff and non-elastomeric. The concentration of R—CH=CH$_2$ monomer units ranges in general from about 25 percent to about 77.5 percent by weight. Copolymers having a higher R—CH=CH$_2$ content are known to be leathery and boardy.

The 5 - alkenyl - 2 - norbornene diolefin monomer units should be present in sufficient amount to provide for sulfur curability, i.e., at least about 0.03 gram-mole per 100 grams of elastomer, while the maximum amount present by weight should be such as to not interfere seriously with the elastic character of the product, i.e., not over about 20 percent by weight. As another indication of adequate curability, the iodine number of the copolymer should be at least 5. The iodine number is a measure of the total unsaturation of the polymer and this unsaturation arises from two sources (1) the alkenyl radical of the 5-alkenyl-2-norbornene and (2) the terminal groups of the polymer chain which, based on infrared evidence, have a double bond of the vinylidene type:

Iodine numbers in excess of about 60 are undesirable in that values higher than this are not needed for curability and may indicate the presence of excessive amounts of diene component.

Still another group of copolymers which may be prepared are copolymers of ethylene, at least one alpha monoolefin as defined above and a 2-alkyl-substituted-2,5-norbornadiene. Representative examples include:

ethylene/propylene/2-methyl-2,5-norbornadiene;
ethylene/propylene/2-ethyl-2,5-norbornadiene;
ethylene/1-butene/2-methyl-2,5-norbornadiene;
ethylene/1-hexene/2-ethyl-2,5-norbornadiene;
ethylene/1-decene/2-butyl-2,5-norbornadiene; and
ethylene/1-heptene/2-octyl-2,5-norbornadiene.

The 2-alkyl-2,5-norbornadienes can be described by the following structural formula

where R is a C$_1$–C$_8$ alkyl radical. These dienes are made by heating acetylenes having the formula R—C≡C—H, where R is a C$_1$–C$_8$ alkyl radical, with cyclopentadiene at 175–225° C. in the absence of a polymerization initiator. Closed reaction vessels made from stainless steel or glass-lined steel are satisfactory.

A valuable embodiment of the present invention is in treating reaction mixtures wherein the above described copolymers have been prepared in slurry form in methylene chloride. The slurry is formed by copolymerizing ethylene with at least one copolymerizable hydrocarbon monomer at a temperature between —30° and 40° C. in the presence of a vanadium coordination catalyst; with the proviso that said copolymerization is carried out in such a manner that the total concentration of copolymerizable monomers shall not exceed 2 molar with methylene chloride. The copolymers precipitate from the reaction mixture during the copolymerization so as to form a methylene chloride hydrocarbon copolymer slurry, which frequently has about 10% solids content. This slurry avoids undesired viscosity build-up and permits ready copolymer separation from the major portion of the methylene chloride by convenient mechanical means.

The coordination catalyst is obtained by mixing a vanadium salt with an organo aluminum compound in an inert solvent. The term "inert" means that the solvent does not interfere with the desired operation of the catalyst during the subsequent polymerization reaction. Representative examples of the vanadium salts are vanadium halides, oxyhalides, and alkoxides, the vanadium being at a valence state of at least 3. The aluminum trialkyls have the structure

wherein $X_1$, $X_2$, and $X_3$ may be the same or different alkyl radicals having up to about 18 carbon atoms. Representative examples of aluminum trialkyls include: triethyl aluminum; tri n-propyl aluminum; triisopropyl aluminum; triisobutyl aluminum, which is preferred; tri n-amyl aluminum; tri n-octyl aluminum; tri n-decyl aluminum; tri n-dodecyl aluminum; tri n-hexadecyl aluminum; diethylpropyl aluminum; diisobutyl hexyl aluminum; and diisoamyloctyl aluminum. The reaction product of 0.5 mole to 2.0 moles of aluminum chloride with 1.0 mole of said aluminum trialkyl is a satisfactory organo aluminum compound. Alkyl aluminum dihalides and dialkyl aluminum monohalides may also be employed. Representative examples of these types include: diisobutyl aluminum monochloride; diethyl aluminum monochloride; isobutyl aluminum dichloride; isobutyl aluminum dibromide; ethyl aluminum dichloride; ethyl aluminum sesquichloride; isobutyl aluminum sesquichloride. Mixtures of these aluminum compounds or mixtures of the vanadium compounds can be employed when desired. Representative examples of these catalysts are most particularly described in U.S. Patent 2,962,451. As is apparent to those skilled in the art, a selection of the preferred catalyst component will depend to a certain extent on the particular copolymer to be prepared. In making the ethylene/propylene copolymer or the ethylene/propylene/1,4-hexadiene copolymer the preferred catalyst is made by mixing vanadium tris(acetylacetonate) with the reaction product of 1 mole of triisobutyl aluminum and ½ mole of aluminum chloride.

In preparing the coordination catalysts either the aluminum compound or the vanadium compound is contacted with a mixture of the other in the inert solvent; alternatively, both compounds are introduced simultaneously into the inert solvent. On account of the instability of organo aluminum solutions in halogenated hydrocarbons, the organo aluminum compounds are sometimes supplied commercially for operating safety as hydrocarbon solutions. Since the catalyst concentration in the polymerization mixture is very low, the small amount of hydrocarbon diluent thereby introduced will not interfere with the copolymer/methylene chloride slurry formation. In general, the total concentration of (hydrocarbon solvent+all monomers) shall not exceed about 2 molar with methylene chloride.

The catalyst can be formed before, during, or after the introduction of the copolymerizable monomers. When making the above-described representative coordination catalysts, the proportions of the aluminum compound to the vanadium compound are selected so the Al:V molar ratio has a value of at least about 1.5:1.

Those skilled in the art can determine the best proportion to use with a particular set of catalyst components. When diisobutyl aluminum chloride or triisobutyl aluminum is employed with $VOCl_3$, the value of the molar ratio of Al:V preferably ranges from about 1.5:1 to 2.5:1. Similar proportions are employed when the aluminum compound is made by reacting triisobutylaluminum with aluminum chloride. Higher values of the Al:V ratio can be used if desired. When vanadium tris(acetylacetonate) is employed, the Al:V ratio preferably ranges from about 4:1 to 10:1.

Those skilled in the art can determine the concentrations of the aluminum and vanadium compounds which give the most convenient process and the copolymer product best suited for a particular purpose. The vanadium concentration in the reaction mixture usually ranges from about 0.00005 to 0.1 molar, 0.0005 to 0.05 molar often being preferred. It is possible to prepare concentrated mixtures which, when desired, can be diluted by addition of more liquid methylene chloride.

As noted above, the catalysts used in the present invention can be made in the presence or absence of the copolymerizable monomers. In the former case, the representative vanadium and aluminum compounds can be simultaneously or sequentially added in a single portion or intermittently or continually to a mixture of part or all of the monomers in the inert solvent. In the latter case, a so-called "premixed" catalyst is made. It can be stored in the absence of air, water, carbon dioxide, Zerewitinoff active hydrogen compounds, and the like for indefinite periods of time at room temperature. In general, the catalyst stability decreases as the temperature is raised.

In preparing the slurry by copolymerization in methylene chloride, the monomer mixture is contacted at −30° to 40° C. with the coordination catalyst at atmospheric, subatmospheric or superatmospheric pressure. In typical procedures the representative above-described vanadium and aluminum compounds are added to the methylene chloride before, at the same time, or after monomer addition occurs. The operating temperature is a critical feature of that copolymerization process. If the process is operated above 40° C., partial or complete solubilization of the copolymer product will occur. At temperatures above 50° C. the catalyst activity tends to be inconveniently short lived because of interaction between the halogenated hydrocarbon and the catalyst component. It is generally inconvenient to operate at temperatures below −30° C. because additional cooling equipment is required; furthermore, at temperatures much below −30° C. the reaction rate is undesirably reduced and it is more difficult to prepare copolymers of suitable composition. The preferred temperature for copolymerization in methylene chloride at atmospheric pressure lies between about −15° C. and 15° C. At temperatures above 15° C. at atmospheric pressure the yield per unit volume of reactor tends to decrease; this result probably reflects the decreased monomer solubility in the methylene chloride.

In carrying out the polymerization process, the monomers are introduced, separately or in admixture, at a rate equal to or in excess of the rate at which copolymer is formed. All of the monomers may be present before the run is started. Alternatively, part or all of the monomers may be added during the polymerization. It is preferred that gas monomer mixtures contain at least 5 mole percent ethylene. This introduction may be continuous or periodic. In order to avoid unduly fast reaction rates and to avoid solubilization of the copolymer, the maximum total concentration of the monomers in the methylene chloride should not exceed the above-described limit.

The copolymers can be prepared by a continuous process at atmospheric or superatmospheric pressure. Thus, the methylene chloride, aluminum and vanadium compounds, and monomers may be introduced continuously into a polymerization zone at such a rate as to provide a residence time sufficient to build up the desired concentration of copolymer in the polymerization mass. The residence time may vary widely, from, say, 10 minutes to several hours or more. In general, the residence time will be shorter as the concentrations of monomers and catalysts in the feed stream are increased. The polymer slurry which continually overflows from the polymerization zone is contacted in a subsequent zone with a catalyst deactivator; the copolymer is ultimately continually obtained after suitable continuous purification and isolation procedures similar to those described below.

In operating the polymerization process care should be taken to exclude all traces of moisture and oxygen since they tend to poison the catalyst systems. A protective atmosphere of an inert gas such as argon or nitrogen is often supplied prior to the introduction of the gaseous monomer feed stream. Monomer gases can be purified by passing them successively through columns of silica gel, scrubbers containing triisobutyl aluminum, and a column of silica gel connected to the inlet tube of the reaction vessel. The dienes and normally liquid alpha monoolefins can be purified by fractional distillation and passage through silica gel.

The copolymer product separates during the reaction and forms a slurry with the methylene chloride which avoids undesired viscosity build-up and permits ready isolation. At this point the reaction, optionally, can be stopped by deactivating the catalyst with alcohol. Usually the copolymer is separated from the major portion of the methylene chloride by conventional mechanical means, such as filtration or centrifugation. A non-volatile antioxidant such as 2,2'-methylene bis(6-tert-btuyl-4-methylphenol) or 4,4'-thiobis(2-tert-btuyl-5-methylphenol), is often incorporated prior to the washing step to avoid possible oxidation and degradation of the copolymer when it is finally isolated by drum drying or the like. Alternatively, the separation step is omitted, the washing mixture being formed in situ by addition of suitable amounts of methylene chloride and alcohol.

As mentioned above, an ethylene hydrocarbon copolymer having a low residual vanadium content is obtained when, according to the process of this invention, the copolymer is slurried with a washing solution consisting of 90 to 65% by volume of methylene chloride and 10 to 35% by volume of a lower alkyl alcohol (or a mixture of at least two said alcohols). The alcohols include methyl alcohol, which is preferred, ethyl alcohol, propyl alcohol, isopropyl alcohol, butyl alcohol, isobutyl alcohol, and teritary butyl alcohol. As stated before, mixtures of two or more of any of these alcohols in any proportion may be employed as the alcohol component of the washing solution.

If the washing solution contains less than 10% by volume of the alcohol, an undesirably large proportion of vanadium catalyst is left in the copolymer and there is a tendency, as stated above, to extract low molecular weight polymer fractions, thereby harming the copolymer product and complicating solvent recycle. Furthermore the copolymer is obtained as a swollen, agglomerated cake which is difficult to handle and to dry. When more than 35% by volume of the alcohol is present, catalyst removal is unsatisfactory because of unsatisfactory dispersal of the copolymer in the washing solution. Satisfactory dispersal of the washing solution occurs when 10 to 35% alcohol is present; the copolymer subsequently isolated has a very low residual vanadium content, for example as low as 8 ppm.

The alcohol present in the washing solution effectively deactivates the catalyst. Therefore, it is not necessary to use additional conventional deactivation agents. However, if desired, the catalyst may be deactivated by adding conventional deactivation agents, i.e. alcohols such as ethanol, isopropanol, isobutanol, and the like to the reaction mixture before the purification step of the present invention. Sufficient alcohol is generally added for deactivation so that the molar ratio of hydroxyl:vanadium has a value of at least 1. The solids content of the slurry being treated is not critical except that it should not be so high that proper dispersion of the washing solution is impeded. The slurries should contain at least about 20% by weight copolymer (preferably 20 to 30%) and about 80 to 70% methylene chloride and alcohol. Generally, slurries containing up to about 50% by weight of copolymer can be purified by the process of this invention. Excessive dilution with the deactivating alcohol will usually be avoided to minimize solvent recovery costs and to maximize the yields per unit volume of reactor space.

In carrying out the present invention the concentration of alcohol in the washing solution can be varied in many ways. For example, pure alcohol (1 to 4 carbon atoms) can be added to a methylene chloride slurry of a copolymer until the desired concentration is obtained. On the other hand, a mixture of alcohol (1 to 4 carbon atoms) and methylene chloride can be separately prepared and added to the methylene chloride-copolymer slurry or the mixture can be added to the filter cake collected from the polymerization process.

It should be understood that the present invention does not depend upon the preparation of the copolymer by a slurry polymerization process. The copolymer can be made in solution and isolated and subsequently dispersed in methylene chloride to form a slurry to which the necessary volume of alcohol is later added. Alternatively the isolated copolymer can be dispersed in a methylene chloride/alcohol mixture to form a slurry. U.S. Patent 2,933,480 describes typical procedures for preparing copolymers in solution.

The washing time is not critical. Five to 15 minutes is usually enough, but longer periods are permissible if desired. The temperature is not critical. Room temperature (20 to 30° C.) is convenient; alternatively, temperatures as low as −30° C. or as high as 40° C. are satisfactory. Below −30° C. costs are prohibitive; about 40° C. the methylene chloride boils at atmospheric pressure and its ability to dissolve the polymer is increased.

After the slurry has been stirred for about 5 to 15 minutes with the washing solution, the copolymer can be mechanically separated by means familiar to those skilled in the art. For example, the slurry can be filtered or centrifuged to remove the major portion of the washing solution. If desired, the copolymer thus obtained can be again washed with fresh washing solution. The purification can be repeated as many times as desired. Finally dry copolymer is recovered by conventional methods such as evaporative distillation, drum drying, flash-drying, and the like.

The following examples will better illustrate the nature of the present invention; however, the invention is not intended to be limited to these examples. Parts are by weight unless otherwise indicated.

EXAMPLE 1

A. *Preparation of vanadium tris(acetylacetonate)*

Three grams of $VCl_3$ were dissolved in 10 milliliters of dilute sulfuric acid. The resulting solution was added to 20 milliliters of acetylacetone in an Erlenmeyer flask. When this mixture was shaken, a reaction occurred and heat was evolved. Five minutes later the resulting dark brown solution was neutralized with aqueous sodium carbonate. The brown crystals which then precipitated were collected by filtration, washed with water and air-dried. Seven grams of vanadium tris(acetylacetonate) were obtained melting at 195–196° C. (after recrystallization from benzene and petroleum ether).

*Anal.*:—Calc'd for $VC_{15}H_{21}O_6$: 14.4% V. Found: 14.6, 14.5% V.

B. *Preparation of ethylene/propylene/1,4-hexadiene copolymer slurry in methylene chloride*

The reaction flask was a 2-liter glass resin flask equipped with a stirrer, thermometer, a gas inlet tube, a gas outlet tube, and a liquid inlet tube covered with a rubber (serum) cap. This apparatus was flame-dried and allowed to cool under a stream of purified nitrogen which was maintained during subsequent operations until monomer gasses were introduced.

Two liters of methylene chloride at about 25° C. were filtered through a column of silica gel directly into the reaction flask and sparged with purified nitrogen for about 10 minutes while rapidly stirred. The nitrogen feed was stopped and a monomer gas mixture supplying ethylene and propylene at respective rates of 3 and 4 liters/minute was introduced below the liquid of the agitated solution. After 15 minutes, during which time the methylene chloride was cooled to 0° C., 0.12 mole of 1,4-hexadiene, 0.002 mole of vanadium tris(acetylacetonate) and 0.018 mole of diisobutyl aluminum chloride were added. The ethylene and propylene had been metered separately through flowmeters connected to separate purification trains where they passed successively through a column of silica gel, three columns each containing 20% solution of aluminum triisobutyl in "Nujol" oil (a liquid petrolatum of specific gravity 0.88/0.90 at 60° F.), a column of "Nujol" oil, and a final silica gel column leading to a T-tube joining the streams. The nitrogen has been purified by passage through a similar train. For 30 minutes the reaction mixture was agitated at about 0° C. while monomer gases were introduced and copolymer product precipitated to form a slurry. The monomer feed stream was then stopped. Filtration gave a copolymer-methylene chloride cake having about 25% solids.

C. Washing the copolymer

Several 25-gram portions of the copolymer cake obtained in Part B above were washed at 25° C. for 10 minutes with methylene chloride-methanol mixtures in a 1000-milliliter resin flask, equipped with a propeller type stirrer. The wash slurries obtained were than filtered, the residual methylene chloride being removed by evaporation at room temperature to give dry copolymer. Table I gives the data.

TABLE I

| Run | Mixture Vol. (ml.) | Volume Percent* Methanol | Appearance of Wash Slurry | Appearance of resulting filter cake | Vanadium, parts/million in dry copolymer |
|---|---|---|---|---|---|
| 1 | 100 | 12 | Well dispersed | Agglomerated | 68 |
| 2 | 100 | 16 | Well dispersed | Granular, slightly swollen. | 36 |
| 3 | 150 | 19 | Fair dispersion | Granular, not swollen. | 41 |

[The following runs used the procedure of part C, but the volume percent Methanol was beyond the critical limits of the invention]

| 4 | 100 | 6 | Well dispersed | Agglomerated | 78 |
| 5 | 100 | 37 | Poor dispersion. | Granular | 99 |

*The volume percent methanol is calculated by dividing the volume of added methanol by the volume of the following sum. (Volume added methanol plus volume added methylene chloride plus volume methylene chloride in filter cake).

EXAMPLE 2

The copolymer was prepared by the procedures of Parts A and B of Example 1 above.

At the end of the polymerization reaction the catalyst was deactivated by addition of 10 milliliters of methanol. The copolymer was filtered off to give a cake containing about 25% solids. Samples equivalent to 100-gram portions of this cake were twice washed at 25° C. for 5 minutes in an agitated 500-milliliter resin flask with fresh 125-milliliter portions of methylene chloride-methanol mixtures having the compositions disclosed in Table II below. The dry copolymer was isolated by the procedure of Part C of Example 1 above.

TABLE II

| Run | Volume Percent Methanol | Appearance of Wash slurry | Appearance of Filter cake | Vanadium, parts/million in copolymer |
|---|---|---|---|---|
| 1 | 10 | Well dispersed | Agglomerated | 19 |
| 2 | 15 | do | do | 14 |
| 3 | 20 | Less well dispersed than 1-2. | Agglomerated but crumbly when dry. | 8 |
| 4 | 25 | Granular slurry | Granular cake | 16 |
| 5 | 30 | do | do | 18 |

EXAMPLE 3

The copolymer was prepared according to the procedure of Example 1 Parts A and B except that the flow rate of ethylene was 4 liters per minute instead of 3 liters per minute. The filter cake was washed with a methanol-methylene chloride mixture and dry copolymer was isolated according to the general procedure of Part C of Example 1 above. The results obtained are given in Table III below.

TABLE III

| Run | Volume Percent Methanol | Appearance of Filter cake | Vanadium, parts/million in copolymer |
|---|---|---|---|
| 1 | 10 | Agglomerated | 29 |
| 2 | 15 | do | 8 |
| 3 | 20 | Agglomerated but crumbly when dry. | 25 |
| 4 | 25 | Granular | 22 |
| 5 | 30 | do | 25 |

The following two tests show the effect of trying to operate the invention outside the range of concentration specified. In particular, they show the effect of a high methanol concentration in the washing step, difficulty in dispersing the copolymer properly in the wash mixture and poor removal of vanadium catalyst.

The copolymers were prepared by the procedures of Parts A and B of Example 1 above. A 100-gram portion of the resulting filter cake containing 25% solids was added to 200-milliliters of methanol and stirred for 1 minute in an Osterizer at low speed at 25° C. The methanol in the wash solution was about 75% by volume.

The copolymer broke up into granules about 1/16 inch in diameter and was easily filtered and dried. However, the vandium content in the dry copolymer was 100 parts per million.

The above procedure was repeated except that the copolymer was washed for 10 minutes in a stirred resin flask with a mixture of 150 milliliters of methanol and 50 milliliters of methylene chloride. The methanol concentration in the washing solution was about 60% by volume. The copolymer did not break up into small pieces but stayed in lumps about ½ inch in diameter. The dry copolymer finally obtained contained about 90 parts per million vanadium.

As many widely different embodiments of this invention may be made without departing from the spirit and scope thereof, it is to be understood that this invention is not limited to the specific embodiments thereof except as defined in the appended claims.

What is claimed is:

1. A process for the removal of vanadium catalyst residues from a methylene chloride slurry of a normally solid hydrocarbon copolymer comprising (A) forming dispersed granular copolymer particles having a general size of about 1/32 to 1/4 inch in diameter by adding an alcohol selected from the group consisting of an alcohol having up to 4 carbon atoms and mixtures of alcohols having up to 4 carbon atoms, said particles being swollen by the alcohol/methylene chloride mixture and said alcohol being added in amount of 10 to 35 percent by volume based on the total volume of said alcohol and methylene chloride and (B) separating the hydrocarbon copolymer from said slurry to obtain said copolymer having less than about 68 parts per million of vanadium; said solid hydrocarbon copolymer being a copolymer of ethylene and at least one other copolymerizable monomer and containing residues of a vanadium catalyst formed by mixing a vanadium salt with a member selected from the group consisting of an aluminum trialkyl, an alkyl aluminum halide and the reaction product of a molar proportion of an aluminum trialkyl and 0.5 to 2 molar portions of an aluminium halide.

2. A process for the removal of vanadium catalyst residues from a methylene chloride slurry of a normally solid hydrocarbon copolymer comprising (A) forming dispersed granular copolymer particles having a general size of about 1/32 to 1/4 inch in diameter by adding methylene chloride and an alcohol selected from the group consisting of an alcohol having up to 4 carbon atoms and mixtures of alcohols having up to 4 carbon atoms, said particles being swollen by the alcohol/methylene chloride mixture and said methylene chloride and said alcohol being added in amount to give 10 to 35 percent by volume of said alcohol and 90 to 65 percent by volume of said methylene chloride based on the total volume of alcohol and methylene chloride and (B) separating the hydrocarbon copolymer from said slurry to obtain said copolymer having less than about 68 parts per million of vanadium; said solid hydrocarbon copolymer being a copolymer of ethylene and at least one other copolymerizable monomer and containing residues of a vanadium catalyst formed by mixing a vanadium salt with a member selected from the group consisting of an aluminum trialkyl, an alkyl aluminum halide and the reaction product of a molar proportion of an aluminum trialkyl and 0.5 to 2 molar portions of an aluminum halide.

3. A process as described in claim 1 where said hydrocarbon copolymer is a copolymmer of ethylene, propylene and 1,4-hexadiene.

4. A process as described in claim 1 where said vanadium catalyst is vanadium tris(acetylacetonate) and aluminum diisobutylmonochloride.

5. A process as described in claim 1 where said alcohol is methanol.

6. A process as described in claim 1 wherein said slurry has a copolymer content of about 20% to 30% by weight of the slurry.

7. In a process for preparing a normally solid hydrocarbon copolymer by reacting ethylene and at least one other copolymerizable compound at a temperature between $-30°$ and $+40°$ C. in the presence of a vanadium coordination catalyst formed by mixing a vanadium salt with aluminum trialkyl, alkyl aluminum halide or the reaction product of a molar portion of an aluminum trialkyl and 0.5 to 2 molar portions of an aluminum halide, said reactants and catalysts being maintained in methylene chloride solution in quantities to give no more than 2 molar solutions of the total reactants in said methylene chloride, the improvement which comprises (a) forming dispersed granular copolymer particles having a general size of about 1/32 to 1/4 inch in diameter by adding an alcohol having up to 4 carbon atoms or mixtures of alcohols having up to 4 carbon atoms, said particles being swollen by the alcohol/methylene chloride mixture and to said reaction mixture upon completion of the desired degree of polymerization, said alcohol being added to said reaction mixture in an amount to give 10 to 35% by volume based upon the total volume of said alcohol and methylene chloride, and (b) separating said copolymer from said reaction mixture to obtain said copolymer having less than about 68 parts per million of vanadium.

8. A process as described in claim 7 where said vanadium catalyst is vanadium tris(acetylacetonate) and aluminum diisobutylmonochloride.

9. A process as described in claim 7 where said alcohol is methanol.

References Cited by the Examiner
UNITED STATES PATENTS 3,036,055  5/1962  Greenwell _____ 260—93.7
3,058,971  10/1962  Miller et al. _____ 260—94.9

OTHER REFERENCES

Chemical Abstracts, vol. 49, No. 11, col. 7348 at f–h (1955).

JOSEPH L. SCHOFER, *Primary Examiner.*

JOSEPH R. LIBERMAN, *Examiner.*

W. C. GOODSON, W. HOOVER, *Assistant Examiners.*